C. J. ESCALANTE.
SPRING SUSPENSION FOR AUTOMOBILES.
APPLICATION FILED AUG. 8, 1917.
1,266,436.
Patented May 14, 1918.
2 SHEETS—SHEET 2.
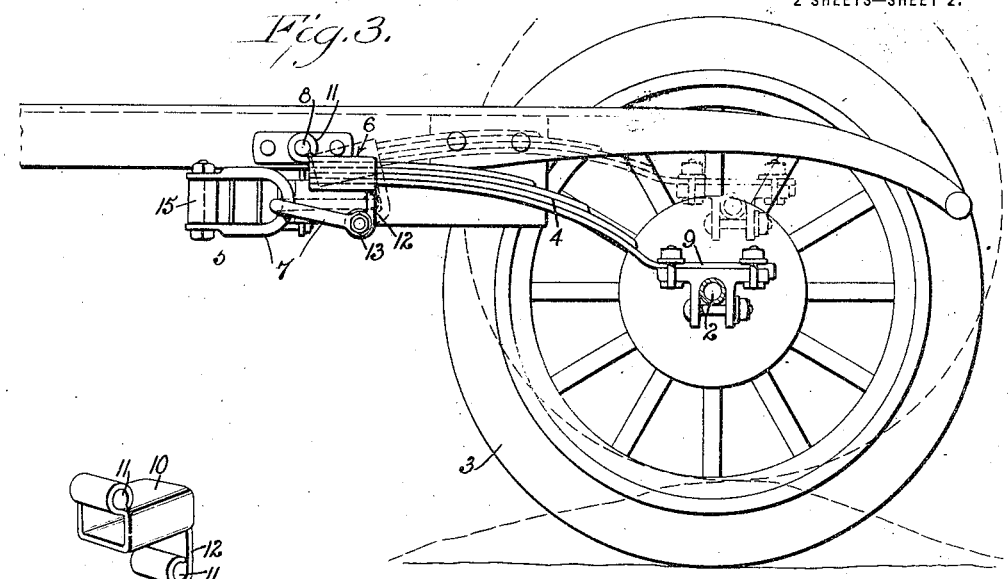
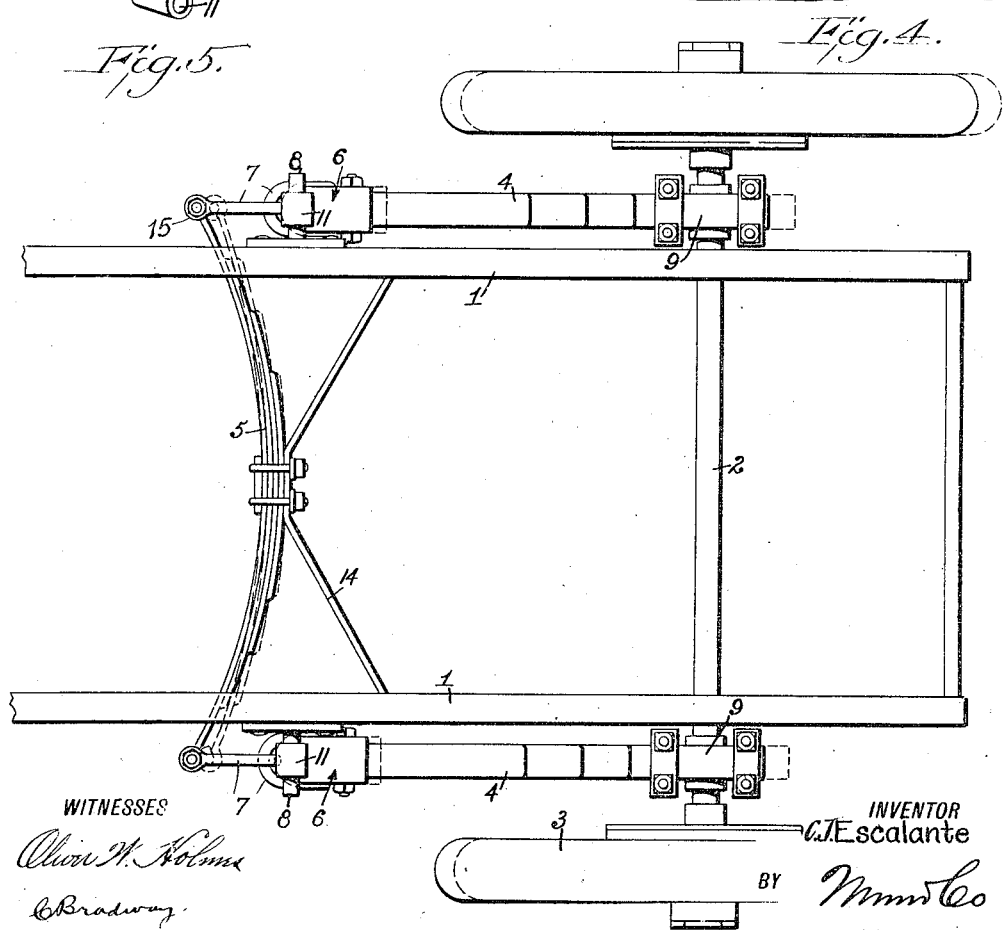
WITNESSES
INVENTOR
C. J. Escalante
BY
ATTORNEYS

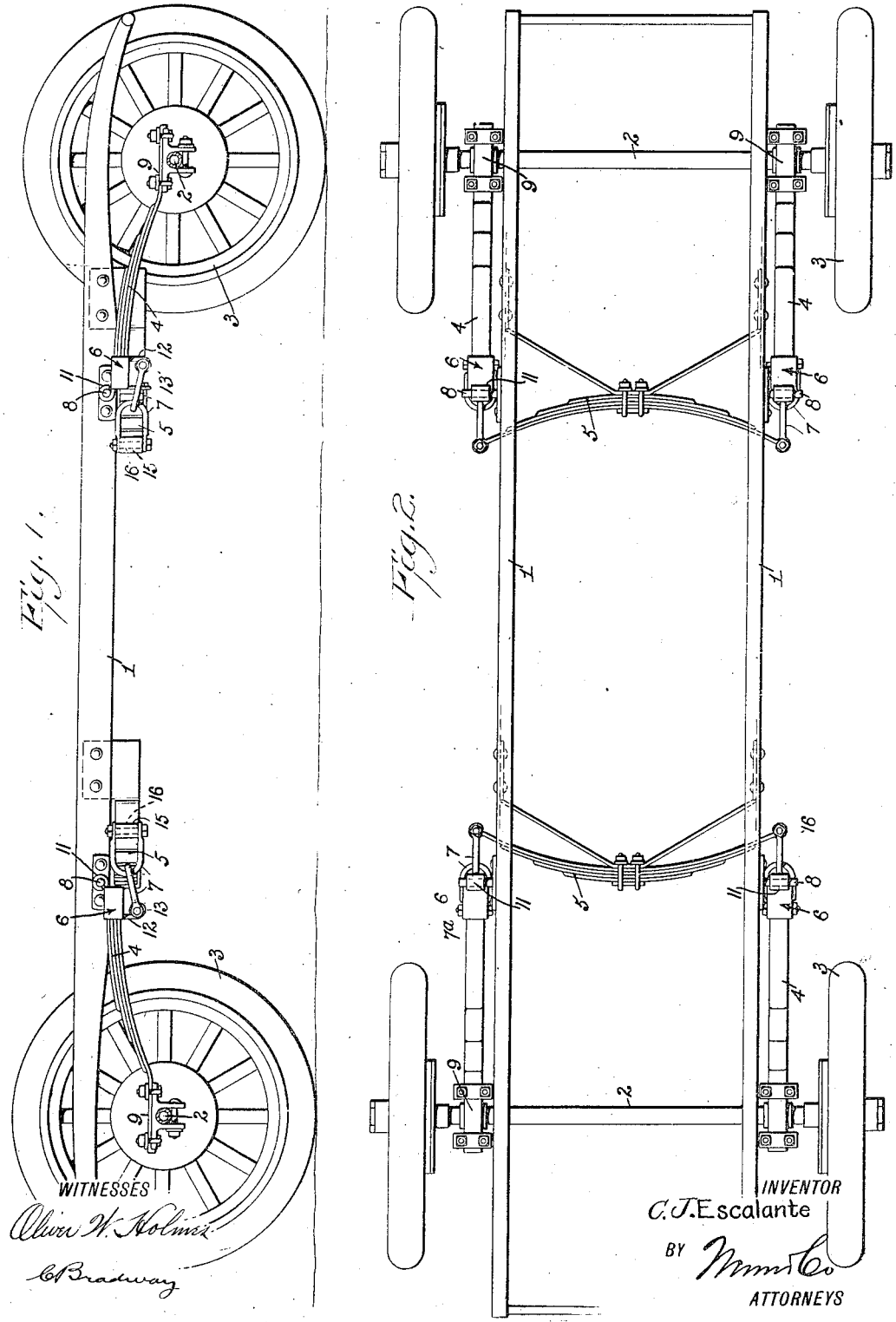

UNITED STATES PATENT OFFICE.

CHARLES JOSEPH ESCALANTE, OF MERIDA, MEXICO.

SPRING SUSPENSION FOR AUTOMOBILES.

1,266,436.

Specification of Letters Patent.  Patented May 14, 1918.

Application filed August 8, 1917. Serial No. 185,123.

*To all whom it may concern:*

Be it known that I, CHARLES JOSEPH ESCALANTE, a citizen of Mexico, and a resident of the city of Merida, State of Yucatan, Republic of Mexico, have invented a new and Improved Spring Suspension for Automobiles, of which the following is a full, clear, and exact description.

This invention relates to vehicles, and deals particularly with spring suspension systems for automobiles.

The invention has for its general objects to improve and simplify the construction of vehicle body springs whereby the maximum smoothness of running and comfort to the occupants are obtained by a novel, simple and inexpensive arrangement of springs.

A more specific object of the invention is the provision of a novel arrangement of springs which are pivotally connected with the frame and suitably connected with the axles, in combination with a spring fastened to the frame and having its free ends shackled to the first-mentioned springs adjacent their pivots, whereby the up and down movement of the said first-mentioned springs with the wheels and axle causes the spring to be flexed so as to yieldingly resist said relative movement of the wheels and body, whereby smooth and easy suspension of the body is obtained and the wheels are maintained in contact with the road surface, eliminating bouncing, rebounding or jolts.

One of the principal objects of the invention is to provide means, in connection with the side springs connected with the axles and pivotally connected with the vehicle frame or body, whereby rebounding is reduced to a minimum, this being accomplished by employing a third spring which has its ends connected by novel shackling means with the side springs adjacent their pivoted ends so that the ends of the third spring yield to a less extent than the movement of the side springs.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention wherein similar characters of reference indicate corresponding parts in all the views, Figure 1 is a longitudinal section of a chassis embodying the improved spring suspension system;

Fig. 2 is a plan view of the chassis;

Fig. 3 is an enlarged sectional view of one end of the chassis;

Fig. 4 is a plan view of Fig. 3;

Fig. 5 is a perspective view of one of the members of the shackle.

Referring to the drawing, 1 designates the side bars of the frame of an automobile, 2 the axles and 3 the wheels.

Between each set of wheels and the body is a spring suspension composed of a pair of quarter elliptical leaf springs 4 and a single semi-elliptical spring 5, which springs are connected with the side beams 1 of the vehicle frame by a special form of shackle means composed of a coupling member 6, interlaced links 7, and a stud 8. The springs 4 extend parallel with the sides of the vehicle frame and have their ends 9 rigidly fastened to the axle. The butt end of each quarter elliptic spring is disposed in a box 10 which forms the body of the coupling or shackle member 6. This box has an upper eye 11 which receives the horizontal stud 8 projecting outwardly from the side bar or beam 1, and also on the box 10 is a depending arm 12 terminating in an eye 13, to which is pivotally connected one of the links 7. Each spring 5 is rigidly fastened to the vehicle body by braces 14 fastened to the center of the semi-elliptical spring 5 and to the side bars 1. The outer ends of the spring 5 terminate in eyes 15 to which one of the links 7 is pivotally connected. The springs 4 swing in a vertical plane and through the interlaced links 7 the spring 5 flexes in a horizontal plane to yieldingly resist the swinging of the springs 4. This special arrangement of springs insures easy and smooth running of the car.

From the foregoing description taken in connection with the accompanying drawing, the advantages of the construction and method of operation will be readily understood by those skilled in the art to which the invention appertains, and while I have described the principle of operation, together with the structure which I now consider to be the best embodiment thereof, I desire to have it understood that the structure shown is merely illustrative and that such changes may be made when desired as fall within the scope of the appended claims.

Having thus described my invention, I claim as new and desire to secure by Letters Patent:

1. The combination of a vehicle frame, an axle, wheels on the axle, springs connected with the axle and pivotally connected with the frame, and a spring connected with the frame and having its free ends connected with the first-mentioned springs at a point between the pivots thereof and said axle.

2. The combination of a vehicle frame, an axle, wheels on the axle, quarter elliptic springs pivotally connected with the frame and connected with the axle, a semi-elliptic spring mounted transversely on the frame with its outer ends free, and shackle means connecting the free ends of the transverse spring to the first-mentioned springs at points adjacent the pivots thereof and between the pivots and axle.

3. The combination of a vehicle frame, an axle, wheels on the axle, quarter elliptic springs having their free ends connected with the axle, a coupling member to which the other end of each spring is fastened, a pivot between the coupling member and the vehicle frame, a link connected with each coupling member, and a horizontal yielding spring fastened on and disposed under the frame and connected with the links.

4. The combination of a vehicle body, an axle, wheels on the axle, vertically yielding springs connected with the axle and pivotally connected with the frame, and horizontally yielding spring means on and disposed under the frame at a point inwardly from the wheels and linked to the first-mentioned springs at points adjacent their pivoted ends.

5. The combination of a vehicle frame, front and rear axles, wheels on the axles, vertically yielding quarter elliptic springs fastened to the axles and pivotally connected with the frame, horizontally yielding semi-elliptic springs disposed transversely to the frame, means for rigidly fastening the center of each semi-elliptic spring to the frame, and connecting means between the outer ends of the semi-elliptic springs and the first-mentioned springs at points adjacent the pivots thereof and between the latter and axles.

6. The combination of a vehicle frame, front and rear axles, wheels on the axles, springs connected with the axles and extending inwardly toward the center of the frame, means pivotally connecting the inner ends of the springs with the sides of the frame, a transverse spring disposed under the frame at a point inwardly from each axle, and flexible means connecting the outer ends of the transverse springs with the adjacent first-mentioned springs.

7. The combination of a vehicle frame, front and rear axles, wheels on the axles, springs connected with the axles and extending inwardly toward the center of the frame, means pivotally connecting the inner ends of the springs with the sides of the frame, a transverse spring disposed under the frame at a point inwardly from each axle, a link vertically pivoted to the outer end of each transverse spring and extending outwardly therefrom, a coupling connected with the pivoted end of each of the first-mentioned springs, and a link horizontally pivoted to each coupling at a point under the associated spring and connected with the adjacent link of the transverse spring.

CHARLES JOSEPH ESCALANTE.